Dec. 15, 1964   E. R. SWANSON ETAL   3,161,880
SYSTEM AND METHOD FOR OBTAINING MEDIUM ACCURACY NAVIGATION
Filed Dec. 19, 1962

INVENTORS
ERIC R. SWANSON
WAYNE E. DAVIS
BY

ATTORNEYS

United States Patent Office 3,161,880
Patented Dec. 15, 1964

3,161,880
SYSTEM AND METHOD FOR OBTAINING
MEDIUM ACCURACY NAVIGATION
Eric R. Swanson, San Diego, and Wayne E. Davis, Santa Ana, Calif.; said Swanson assignor to the United States of America as represented by the Secretary of the Navy; and said Davis assignor to Philco Corporation, Philadelphia, Pa., a corporation of Delaware
Filed Dec. 19, 1962, Ser. No. 245,787
6 Claims. (Cl. 343—105)

The present invention relates to a system and method for obtaining medium accuracy navigation and more particularly, to a method and system for obtaining medium accuracy navigation utilizing lines of position and specifically, to a system and method for obtaining medium accuracy navigation through phase difference measurements on lines of position by comparing the position as determined by a phase difference against a known geographical position.

Since the end of World War II the range and accuracy requirements for military navigation system for ships and aircraft have steadily increased. Specifically, a system is desired which will provide navigation day or night, under all weather conditions, to a range of approximately 5,000 miles with a fixed accuracy of one mile or better. During World War II various systems were used to provide navigation fixes. Among these for instance was Loran A with a 200 mile base line. However, the above system was unduly costly due to the very many transmitting stations required.

Other navigational systems tried included Navarho, Delrac, Cytac (Loran C), Radux, and Radux-Omega.

The present Omega system is an outgrowth of two prior systems. The first was the 40 kilocycle Radux by the U.S. Navy Electronics Laboratory, San Diego, and Naval Research Laboratory, Washington, D.C.; a navigational system originally proposed by Prof. J. A. Pierce of Cruft Laboratory, Harvard University, in 1947. When tested, the Radux system demonstrated the merit of the position-fixing technique used. However, Radux required too many stations for world wide installation, and its plus or minus 3 mile accuracy was considered inadequate.

Radux-Omega was an interim development and consisted of adapting Radux to very low frequency operation using a two frequency technique. Although the use of two frequencies was subsequently abandoned, the work did establish the suitability of VLF for navigation.

In order to be effective, a world wide navigation system must have four attributes: reliability, accuracy, long range, and flexibility. Its reliability should be such that it is usable at all times of day and night. Its accuracy must be equal to the most demanding operational needs. Its range should enable it to cover the entire globe, with its most accurate areas chosen to cover those parts in which most operations may be expected. To be most economical this coverage should be achieved with a minimum number of stations. And finally, for optimum use the navigation system should be usable by any vehicle, i.e., be able to be received in any environment. In addition, capability to provide standard time or frequency or communications information as well as that information used primarily for navigation is possible.

The present Omega system accomplishes the above and in addition thereto through the use of the system and method as disclosed in the present invention medium accuracy navigation is attained beyond that which is available through the use of the basic Omega system.

An object of the present invention is to provide a system for obtaining medium accuracy navigation which is readily adaptable to present Omega navigation systems.

Another object of the present invention is to provide a system for obtaining medium accuracy navigation which is reliable, accurate and which is entirely passive.

A further object of the present invention is to provide a method for obtaining medium accuracy navigation which is readily adaptable to present Omega navigation systems and which is extremely flexible in use.

An additional object of the present invention is to provide a method for obtaining medium accuracy navigation which provides medium accuracy navigation in conjunction with an extremely long range navigational system.

A further object of the present invention is to provide a system and method for obtaining medium accuracy navigation which is low cost and is readily adaptable to the present Omega long range navigational system.

Other objects and many of the attendant advantages of this invention will be readily appreciated as the same becomes better understood by reference to the following detailed description when considered in connection with the accompanying drawings wherein.

Figure 1:
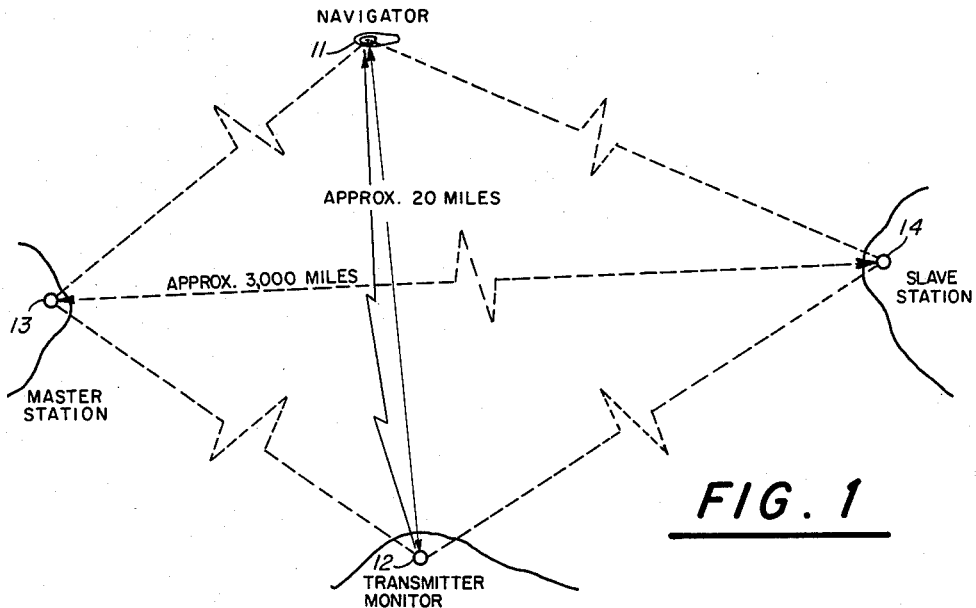
FIG. 1 is a schematic representation of the system for obtaining medium accuracy navigation.

By way of background, a brief explanation of Omega is given. Omega is an electromagnetic navigation system which depends upon the accurate measurement of phase difference of signals received from two stations to determine a line-of-position. As an alternative, instead of having two stations one station might transmit frequencies slightly separated on a time-shared basis and also use the measured phase difference to determine the line-of-position.

In many respects Omega is similar to Loran; it has hyperbolic lines-of-position and utilizes fixed transmitters and mobile receivers. Hyperbolic lines-of-position is not a necessary condition, however, in that the general method would work just as well for example on hyperbolic elliptical lines. Also, Omega is passive for the using ship and/or aircraft. It differs, however, in three important respects: long range (5000 to 8000 miles instead of 200 to 2000), the use of radio waves in the very low frequency (VLF) band (3 to 30 kilocycles), and the use of phase difference measurement instead of time difference measurement. One important characteristic of Omega should be noted: it is a true fixing system, not a dead reckoning system as are inertial navigators and other VLF and other electromagnetic navigation systems. The difference is important, in that a dead reckoning system depends upon continuous operation and periodic fixes to correct its errors and set it upon a proper track again while a fixing system gives the exact location at the time of the fix and is independent of drift, maneuvers of the platform, inoperative periods, and other disturbing factors.

As compared to Radux and Radux-Omega, Omega, the single frequency navigation system, reduces the equipment complexity considerably and, in addition, gives exceptional results. The use of a very low frequency gives good propagation stability and gives reception capability in substantially any environment.

Although Omega gives nominal accuracy of plus or minus 1 mile on 5000 mile base lines it is desirable that accuracy be provided in many instances to better than nominal system accuracy. It would be extremely desirable in restricted areas, for example, in ports, harbor entrances, shallow waters, etc.

Generically non inertial navigation systems measure something or things $X_1, X_2, \ldots X_n$ where $n=1$ or $2er$ ... etc. Each $X_i$ is received from a source $S_i$. Usually, but not necessarily, each $X_i$ has different source $S_i$. The energy required to transmit the navigation information must travel through a medium from the source to the receiver. As such the information transmitted from a source will ordinarily be affected by the medium. The effect can be considered a perturbation. That is, the information actually received from $X_i$, $I_i$, will be equal to the information transmitted from $S_i$, $T_i$, as affected and perturbed by the medium. At least some of the $X_i$ have $I_i$ which is position dependent. It is the position dependence of the $I_i$ which yields a navigation fix. This position dependence is known. Let $I_i = P_i + M_i$ where $P_i$ is the known and used position dependence of the transmitted information $T_i$ and $M_i$ represents variations in $T_i$ and perturbations on $T_i$ introduced by the medium. Note that $P_i$ represents both known and used variation. Known variation which is not used may be absorbed in $M_i$. If variations in the medium should occur, variation will exist in $M_i$ but not $P_i$ since, by definition, $P_i$ is known and used. A variation in $M_i$ will cause a variation in $I_i$. Ordinarily, this will yield an error in a position fix unless $I_i$ is further modified by appropriate $I_j$ before application. Hence, the $I_i$'s, at least some of them, will have spatial gradients. For reasonable functions of the sort one would expect to find used in navigation systems we may then express any information received at one three dimensional point in terms of that obtained at another. In the one dimensional case we may use the Taylor series:

$$F_i(y+h) = F_{i(y)} + hF'_{i(y)} + \frac{h^2}{2!}F''_{i(y)} + \cdots$$

Let functional values about the new point $y+h$ be noted by the subscript 2 while those about $y$ are noted by the subscript 1. Hence $$I_{i2} = P_{i2} + M_{i2} = P_{i2} + M_{i1} + hM'_{i1} + \frac{h^2}{2!}M''_i + \cdots$$

Figure 3:
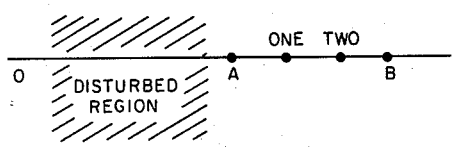
FIG. 3 is a schematic illustrating the concept of the present invention.

That is, the information received at the second point is given by the known and used information associated with the point plus correction terms applicable at the first point. As $P_{i1}$ is known as $I_{i1}$ can be measured, $M_{i1}$ may be determined. Apparently, at zero separation, information obtained at point one may be telemetered to point two so that perfect information may be obtained at two from the operation on $I_{i2}$ of subtracting $I_{j2}$ where $I_{j2} = M_{i1}$. Ordinarily, it would be possible to obtain $I_{j2}$ essentially equal to $M_{i1}$. At separations greater than zero the derivatives of M become important. Their values depend on the structure of the medium at any given time as well as possible geometric variation not included originally in $P_i$. Clearly geometric variation left in M will cause serious variation between $P_{i2} - M_{i1}$ at sufficiently large separation, $h$. It is therefore important that in the original separation of I into P and M, sufficient spatial variation be included in P so that at maximum intended separation, $h_m$, the quantity $$h_m D'_i + \frac{h^2 D''_i}{2!} + \cdots$$

where $D_i$ represents the deliberate, non-random, spatial variation included in M, will be less than maximum tolerable error. Under conditions of negligible $D_i$, the nature of the random variations in $M_i$ becomes all important. Note, however, that only structural changes in the vicinity of point one effect accuracy. Variations in the transmitted information, $T_i$, cause no effect in $$P_{i1} = I_{i1} - M_{i1}$$

since $M_{i1}$ changes. Since the structure is not changed $M_{i1}{}^{(n)} = 0$ and no error can be introduced. Similarly, considering FIGURE 3, drastic perturbation on $T_1$ has occurred between O and A but the medium is unchanged between A and B so that all derivatives of M in the vicinity of a control point one are zero and corrected information at two is accurate.

If, however, the parameters of the media principally affecting $X_i$ tend toward severe fluctuations in short distances, the derivatives $M_{i1}{}^{(n)}$ may become quite large so that $I_{i2} - M_{i1}$ may be further removed from $P_{i2}$ than $I_{i2}$. Hence, telemetering and applying $M_{i1}$ may considerably improve available knowledge at point two or may in fact yield worse information depending on the separation of the points and continuity of the medium. Practically, of course, the gain to be obtained by using the corrected information can be estimated on the basis of the correlation coefficient between measurements at the two points. Generalization to three dimensions would follow the same argument presented in the one dimensional case except that the common perturbation of the type shown in OA of FIGURE 3 would generally not occur but depend on the behavior of the medium at not quite identical points throughout the region.

FIG. 1 illustrates a situation wherein it might be desirable to have a greater degree of accuracy than the nominal Omega system would provide. In this situation a navigator 11 aboard a ship might be maneuvering in a restricted area and in fairly close proximity to a monitor 12. As shown on FIG. 1 the monitor is indicated as being approximately 20 miles from the navigator however, in operation the navigator might be as great as 1500 miles away and still obtain improvements on the order of magnitude of two over nominal system accuracy.

In this instance a master station 13 and slave station 14 are supplying the transmissions from which the line-of-position of the navigator 11 is determined.

Absolute accuracy at the navigator's position is not possible due to, among other things, propagation of slave synchronization therefore, the navigator 11 can only approximate his position, relatively speaking, due to the relative error. However, the relative accuracy and therefore error at monitor 12 would be substantially the same as that at navigator 11. Therefore, if monitor 12 is able to determine the error between an exact geographical fix and the fix obtained through the transmission of electromagnetic energy from master station 13 and slave 14 and transmit any difference between the two fixes to the navigator 11, the navigator 11 may obtain relatively absolute accuracy.

Figure 2:
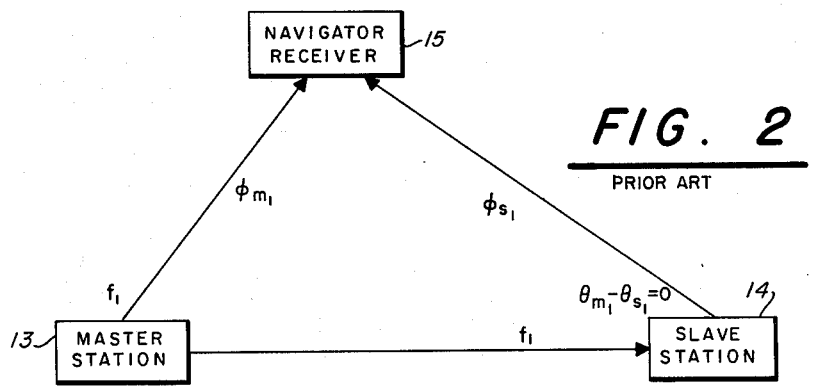
FIG. 2 is a schematic representation of the phase relationships for a line of position system utilizing two stations.

In order to explain the operation of the present invention it is believed well to refer to a brief description of the operating characteristics of an Omega system. This is done with reference to FIG. 2 wherein the master station 13 is shown as well as slave station 14 and any receiver 15. This might be navigator 11 or monitor 12 of FIG. 1. In operation the master station 13 transmits a frequency $F_1$ to the slave station and to the receiver 15. The slave station 14 and master station 13 are synchronized so that the phase difference between the slave station and master station is 0. Instead of zero phase one might use a preselected phase difference. The slave station then transmits the same frequency $F_1$ on a time-shared basis with the master station and the two transmittals are received by the receiver 15. At this time, by the use of appropriate equipment in the receiver 15, the phase difference between the master frequency $F_1$ and the slave frequency $F_1$ are measured and the position of the receiver determined through the use of the hyperbolic phase lines which exist between master and slave stations.

The characteristics and operation of a complete Omega system are given in detail in the Proceedings of the Institute of Radio Engineers, volume 47, No. 5, May 1959, pp. 829 to 839, by C. J. Casselman et al., therefore no further explanation of the details of the Omega system are deemed necessary at this time.

*Operation*

In the operation of the present system the master station 13 transmits on frequency $F_1$ also on a time-shared basis. The frequency $F_1$ of the slave station is phase-locked to signals of corresponding frequencies received from the master station 13. The condition of zero-phase relationship between received master and transmitted slave signals, is indicated by $\theta_{m1} - \theta_{s1} = 0$, where subscripts $m_1$ and $s_1$ designate master and slave signals respectively.

At the navigator's position 11 and the monitor's position 12, a discrete-phase relationship between the $F_1$ signals received from both stations is assured by the synchronisim maintained at the slave station.

As stated previously, any relative errors existing at the navigator 11 will also be existent at the monitor 12. Therefore, if it were possible to determine the monitor's position substantially with no error by an independent means the relative error as determined by the exact geographic position and the position as determined by a measurement of phase difference could be sent to the navigator 11 and the position of the navigator determined with relative precision. The dimension of the difference signal sent depends on whether the signal is representative of the phase difference or whether it is representative of distance and direction, i.e., in terms of latitude and longitude. Theoretically either phase or latitude and longitude error may be sent, however, in actual practice the simplest application would be a phase difference. This is what is done in that the geographic monitor is exactly known. The monitor may be on land or be on a ship or other vehicle located in an exactly known position. The monitor receives transmissions from the master station 13 and slave station 14 and determines the position from the electromagnetic signal, compares this position against the exactly known geographic position and transmits any difference to the navigator 11. The correction may be applied either externally or internally in the equipment, i.e., assuming that the difference is a phase difference which is the more simple application, a simple algebraic subtraction of the error from the monitor from the received phase difference from the master and slave station could be accomplished by rotating a phase shifter incorporated in the conventional Omega equipment. If the treatment were external, again, a simple algebraic subtraction would suffice. Either the internal or the external operation could be accomplished easily in the Omega system as set forth in the Proceedings of the Institute of Radio Engineers description.

Existing equipment may be used for the monitor 12, i.e., Coast Guard station etc., therefore, the cost is nominal for obtaining the medium accuracy navigation.

It is to be understood that instead of using a slave station-master station system one might use an individual master station and use a slight frequency shift to obtain the phase difference on a time-shared basis of the master station. However, for the present a master station and at least one slave station are used to obtain the line-of-position through the measurement of phase difference.

Note that any information of the type received for navigation can be treated as the $X_1$ discussed. Possible X include: Time of arrival of a received radio signal; direction of arrival of a radio signal; direction of arrival of an optical signal from a light house; direction of arrival of an optical signal from a star, phase of a received radio signal, phase of a received sonar signal, etc.

It will be understood that various changes in the details, materials, steps and arrangements of parts, have been described and illustrated in order to explain the nature of the invention, may be made by those skilled in the art within the principle and scope of the invention as expressed in the appended claims.

What is claimed is:

1. A method of obtaining medium accuracy navigation comprising the steps of:
    (a) transmitting electromagnetic energy from a first station;
    (b) transmitting electromagnetic energy from another station;
    (c) receiving said electromagnetic energy transmitted from said first station and from said another station at a position wherein it is desired to determine fixed location on the earth with respect to the earth;
    (d) receiving said electromagnetic energy from said first station and from said another station at another receiver;
    (e) determining the exact geographic position of said another receiver by means other than the received electromagnetic energy;
    (f) determining the geographic position of said another receiver by means of said received electromagnetic energy from said first station and from said another station;
    (g) comparing said geographic position as determined from said other means and said geographic position as determined from said received electromagnetic energy at said another receiver;
    (h) determining the difference between said two geographic positions as determined by said other means and said received electromagnetic energy;
    (i) and sending said difference to said position which is to be determined in order that said receiver may correct said position as determined by said received electromagnetic energy from said first station and from said another station.

2. A method of obtaining medium accuracy navigation comprising:
    (a) transmitting electromagnetic energy at a predetermined frequency to a receiver which is to have its position determined by electromagnetic means;
    (b) transmitting electromagnetic energy to said receiver at another different frequency;
    (c) determining the phase between said two frequencies to determine the geographic position at said receiver by means of electromagnetic means;
    (d) receiving said electromagnetic energy at said two frequencies at a monitor station;
    (e) determining the geographic position of said monitor station by means other than the transmitted electromagnetic energy;
    (f) determining the geographic position of said monitor station by means of said transmitted electromagnetic energy;
    (g) comparing the geographic position of said monitor as determined by said other means and said transmitted electromagnetic energy;
    (h) using said comparison of said geographic position as determined by said two means to determine an error and a difference between said positions as determined by said other means and said transmitted electromagnetic energy means;
    (i) and transmitting said error from said monitor to said receiver so that said receiver may correct the position as determined electromagnetically.

3. A method of obtaining medium accuracy navigation comprising:
    (a) transmitting electromagnetic energy at a fixed frequency to a receiver which is to have its position determined by means of said electromagnetic transmissions;
    (b) transmitting electromagnetic energy from another station far distant from said first station to said receiver at said same frequency;
    (c) receiving said electromagnetic energy at said receiver from the two widely separated stations;
    (d) determining the phase difference between said two received electromagnetic transmissions at said same frequency to determine the geographical position of said receiver;
    (e) receiving said transmitted electromagnetic energy from the two widely separated transmitting stations at a monitor station;
    (f) determining the geographical position of said monitor station exactly by means other than the received electromagnetic energy;

(g) determining the geographical position by means of said received electromagnetic energy received at said monitor;

(h) comparing the two geographical positions obtained to determine any error in position at said monitor;

(i) transmitting said any error obtained to said receiver so that said receiver may adjust to compensate for any error as determined by said monitor station between the exact geographical position and the geographical position determined from said transmitted electromagnetic energy.

4. A method of obtaining medium accuracy navigation comprising:

(a) transmitting electromagnetic energy at two different frequencies from a transmitting station on a time shared basis;

(b) receiving said transmitted energy at the two frequencies at a receiver which is to have its position determined;

(c) comparing the phase difference between said two frequencies to determine the position of said receiver geographically;

(d) receiving said time shared frequencies at a monitor station;

(e) determining the geographical position of said monitor station by means of said phase difference between said transmitted frequencies;

(f) determining the exact geographic location of said monitor station by means other than said transmitted electromagnetic energy;

(g) comparing the geographic position as determined by said transmitted electromagnetic energy and said other means at the monitor station;

(h) transmitting any difference between said two positions as determined by said electromagnetic means and said other means to said receiver which is to have its position determined so that the position of said receiver may be corrected by any difference as determined by said monitor station.

5. A system for obtaining medium accuracy navigation comprising:

(a) a master station for synchronizing at least one slave station and any number of receiving stations and for transmitting a fixed frequency;

(b) at least one slave station for transmitting the same fixed frequency at a widely separated position from said master station;

(c) receiver means which is to have its position determined for receiving said transmitted electromagnetic energy at said frequency from the master station and at least one slave station and comparing the phase difference between the transmitted electromagnetic energy received from said master station and said at least one slave station for determining the geographical position of said receiver by means of said phase difference;

(d) monitor means separated from said receiver means for receiving said electromagnetic energy at said frequency from said master station and said at least one slave station;

(e) exact position fixing means at said monitor station for determining the exact geographical location of said monitor station;

(f) other means at said monitor station for determining the geographical position of said monitor by means of said received electromagnetic energy;

(g) transmitting means at said monitor station for transmitting any difference between said geographical positions as determined by said electromagnetic means and said exact position determining means.

6. A system for obtaining medium accuracy navigation comprising:

(a) at least one station transmitting electromagnetic energy at two slightly separated frequencies;

(b) receiver means which is to have its position determined for receiving said electromagnetic energy;

(c) means at said receiver for measuring the phase difference between said slightly separated frequencies to determine the geographical location of said receiver;

(d) monitor means for receiving said transmitted electromagnetic energy at said slightly separated frequencies;

(e) position fixing means at said monitor means for measuring the phase difference between said slightly separated frequencies to determine the geographical position of said monitor means;

(f) other position fixing means at said monitor station for determining the exact geographical position of said monitor station;

(g) difference determining means for determining the difference between the geographical positions as determined by said electromagnetic means and said other position determining means at said monitor station;

(h) transmitting means at said monitor station for transmitting any difference between the geographical positions to said receiver so that the receiver may adjust its position as determined by the electromagnetic means according to the exact geographical position of said monitor means.

References Cited in the file of this patent

UNITED STATES PATENTS

| 2,982,958 | Yulo et al. | May 2, 1961 |
| 3,028,598 | Gibbs et al. | Apr. 3, 1962 |

OTHER REFERENCES

Proceedings of the I.R.E., May 1959, pp. 829–839.